(12) United States Patent
Thomas

(10) Patent No.: US 12,242,817 B1
(45) Date of Patent: Mar. 4, 2025

(54) ARTIFICIAL INTELLIGENCE MODELS IN AN AUTOMATED CHAT ASSISTANT DETERMINING WORKPLACE ACCOMMODATIONS

(71) Applicant: Ligilo Inc., Richmond, VA (US)

(72) Inventor: Matthew Thomas, Fredericksburg, VA (US)

(73) Assignee: LIGILO INC., Richmond, VA (US)

( * ) Notice: Subject to any disclaimer, the term of this patent is extended or adjusted under 35 U.S.C. 154(b) by 0 days.

(21) Appl. No.: 18/514,224

(22) Filed: Nov. 20, 2023

(51) Int. Cl.
| | |
|---|---|
| G06F 40/30 | (2020.01) |
| G06F 3/08 | (2006.01) |
| G06F 16/24 | (2019.01) |
| G06F 40/284 | (2020.01) |
| G06F 40/40 | (2020.01) |
| G06Q 10/1057 | (2023.01) |

(52) U.S. Cl.
CPC ............ *G06F 40/40* (2020.01); *G06F 40/284* (2020.01); *G06Q 10/1057* (2013.01)

(58) Field of Classification Search
CPC .... G06F 40/211; G06F 40/253; G06F 40/268; G06F 40/284; G06F 40/30; G06F 16/00; G06F 3/08
See application file for complete search history.

(56) References Cited

U.S. PATENT DOCUMENTS

| | | | |
|---|---|---|---|
| 5,848,594 A | 12/1998 | Matheson | |
| 9,183,257 B1 * | 11/2015 | Buchanan | ........... G06F 16/2455 |
| 11,087,283 B2 | 8/2021 | Champaneria | |
| 11,650,996 B1 * | 5/2023 | Daianu | ................. G06N 20/00 |
| | | | 707/771 |
| 2009/0281879 A1 | 11/2009 | Pandya | |

(Continued)

FOREIGN PATENT DOCUMENTS

| | | |
|---|---|---|
| CN | 115293229 | 11/2022 |
| CN | 115640389 | 1/2023 |

(Continued)

OTHER PUBLICATIONS

Galimzhanova et al., title={Rewriting conversational utterances with instructed large language models}, booktitle={2023 IEEE International Conference on Web Intelligence and Intelligent Agent Technology (WI-IAT)}, pp. ={56-63}, year={2023}, month= October (Year: 2023).*

(Continued)

*Primary Examiner* — Lamont M Spooner
(74) *Attorney, Agent, or Firm* — BRYAN CAVE LEIGHTON PAISNER LLP

(57) ABSTRACT

A computer-implemented method including determining whether a query is part of a conversation having a chat history before the query. When the query is part of the conversation, the method can include rephrasing the query, using a first large language model (LLM), based on context from the chat history. The method also can include determining, using a second LLM, whether or not the query is related to accommodations or disabilities. When the query is related to accommodations or disabilities, the method further can include determining one or more accommodations responsive to the query using a third LLM; and formulating a response to the query using a fourth LLM based on the one or more accommodations. Other embodiments are described.

12 Claims, 8 Drawing Sheets

(56) References Cited

U.S. PATENT DOCUMENTS

| | | | |
|---|---|---|---|
| 2013/0117297 A1* | 5/2013 | Liu | G06F 16/3322 |
| | | | 707/767 |
| 2014/0122355 A1 | 5/2014 | Hardtke et al. | |
| 2014/0214711 A1 | 7/2014 | Filstein | |
| 2014/0279637 A1 | 9/2014 | Rafaty et al. | |
| 2015/0026212 A1* | 1/2015 | Fink | G06F 16/951 |
| | | | 707/774 |
| 2015/0039292 A1* | 2/2015 | Suleman | G10L 15/22 |
| | | | 704/9 |
| 2015/0324747 A1 | 11/2015 | Corso et al. | |
| 2015/0378587 A1* | 12/2015 | Falaki | G06F 3/0488 |
| | | | 715/747 |
| 2016/0012131 A1* | 1/2016 | Epstein | G06Q 50/10 |
| | | | 707/706 |
| 2016/0098808 A1 | 4/2016 | Ziobro | |
| 2017/0039269 A1* | 2/2017 | Raff | G06F 16/285 |
| 2017/0300533 A1* | 10/2017 | Zhang | G06N 20/00 |
| 2017/0337326 A1* | 11/2017 | Zhang | G16B 40/00 |
| 2018/0032902 A1 | 2/2018 | Krishnan | |
| 2018/0046780 A1* | 2/2018 | Graiver | G06F 40/44 |
| 2018/0330011 A1* | 11/2018 | DeLuca | G06F 16/9032 |
| 2019/0108276 A1* | 4/2019 | Kovács | G06F 16/243 |
| 2019/0205838 A1 | 7/2019 | Miaoqing | |
| 2019/0220824 A1 | 7/2019 | Liu | |
| 2019/0304447 A1* | 10/2019 | Scavo | G10L 15/22 |
| 2019/0311070 A1* | 10/2019 | Huang | G06F 16/9532 |
| 2019/0318315 A1 | 10/2019 | Clark-Lindh | |
| 2020/0084213 A1* | 3/2020 | Taropa | G06F 16/93 |
| 2020/0169880 A1* | 5/2020 | Wen | H04L 63/102 |
| 2020/0210485 A1* | 7/2020 | Motwani | G06Q 10/063112 |
| 2020/0210929 A1* | 7/2020 | Meng | G06F 16/9535 |
| 2020/0401661 A1* | 12/2020 | Kota | G06N 20/00 |
| 2020/0410011 A1* | 12/2020 | Shi | G06F 16/90332 |
| 2020/0410882 A1* | 12/2020 | Otsuki | G09B 5/06 |
| 2021/0065129 A1 | 3/2021 | Sardesai et al. | |
| 2021/0097374 A1* | 4/2021 | Liu | G06F 16/9535 |
| 2021/0303638 A1* | 9/2021 | Zhong | G06F 40/169 |
| 2022/0067665 A1 | 3/2022 | Westerheide | |
| 2022/0300718 A1* | 9/2022 | Chen | G06N 3/043 |
| 2022/0301072 A1* | 9/2022 | Wang | G06F 40/279 |
| 2022/0374839 A1 | 11/2022 | Dong | |
| 2022/0383206 A1 | 12/2022 | Luong | |
| 2022/0405493 A1 | 12/2022 | Goldie | |
| 2023/0088128 A1 | 3/2023 | Dima | |
| 2023/0096235 A1 | 3/2023 | Hansraj | |
| 2023/0206675 A1* | 6/2023 | Wang | G06F 40/40 |
| | | | 704/9 |
| 2023/0237188 A1 | 7/2023 | Arran | |
| 2023/0252341 A1 | 8/2023 | Arran | |
| 2023/0252418 A1 | 8/2023 | Arran | |
| 2023/0315792 A1* | 10/2023 | Zhang | G06F 16/9538 |
| | | | 707/722 |
| 2023/0419045 A1* | 12/2023 | Feng | G06F 40/35 |
| 2024/0012860 A1* | 1/2024 | Pillitteri | G06Q 50/205 |
| 2024/0346254 A1* | 10/2024 | Liu | G06F 40/40 |

FOREIGN PATENT DOCUMENTS

| | | |
|---|---|---|
| CN | 115659044 | 1/2023 |
| CN | 113191728 | 3/2023 |
| CN | 115481220 | 7/2023 |
| CN | 116401464 | 8/2023 |
| CN | 116562837 | 8/2023 |
| JP | 2008123507 | 5/2008 |
| KR | 102554459 | 7/2023 |
| KR | 20230111169 | 7/2023 |
| WO | 2023096254 | 6/2023 |

OTHER PUBLICATIONS

Search Report and Written Opinion for International Application No. PCT/US2020/041688 Oct. 29, 2020.

Alsaif, SA et al., "Nlp-based Bi-directional Recommendation System: Towards Recommending Jobs to Job Seekers and Resumes to Recruiters," Big Data and Cognitiive Computing 6($): 147, retrieved from https://doi.org/10.3390/bdcc6040147 Dec. 1, 2022.

Ali, I et al., "Resume Classification System Using Natural Language Processing and Machine Learning Techniques," published in Mehran Univ Research Journal of Engineering and Technology 41(1):65-79, retrieved from https://doi.org/10.22581/muet1982.2201.07 Jan. 1, 2022.

Jiechieu, KFF, et al., "Skills Prediction Based on Multi-Label Resume Classificatin Using Cnn With Model Predictions Explanation," published in Neural Computing and Applications 33(10): 5069-5087, retrieved from https://doi.org/10.1007/s00521-020-05302-x Aug. 28, 2020.

Zhao, J., "Embedding-based Recommender System for Job to Candidate Matching on Scale," published in arXiv 2107.0221v, retrieved from https://doi.org/10.48550/arXiv.2107.00221 Jul. 1, 2021.

Qin, C., et al., "Enhancing Person-Job Fit for Talent Recruitment: an Ability-Aware Neural Network Approach," published in SIGIR '18: The 41st International ACM SIGIR Conference on Research and Development in Information Retrieval 2018: 25-34, retrieved from https://doi.org/10.48550/arXiv.1812.08947 Dec. 21, 2018.

\* cited by examiner

ARTIFICIAL INTELLIGENCE MODELS IN AN AUTOMATED CHAT ASSISTANT DETERMINING WORKPLACE ACCOMMODATIONS

TECHNICAL FIELD

This disclosure relates generally to artificial intelligence models in an automated chat assistant determining workplace accommodations.

BACKGROUND

Conventional job-search platforms allow applicants to search for jobs that may be suitable for the skills and/or experience of the applicant. Many individuals experience various disabilities. For example, an individual may have a chronic medical condition, such as multiple sclerosis, which can limit the individual's ability to perform certain job functions. As another example, an individual may have difficulty walking after experiencing a stroke. Conventional platforms do not take into consideration accommodations for a job related to such disabilities.

BRIEF DESCRIPTION OF THE DRAWINGS

To facilitate further description of the embodiments, the following drawings are provided in which.

Figure 1:
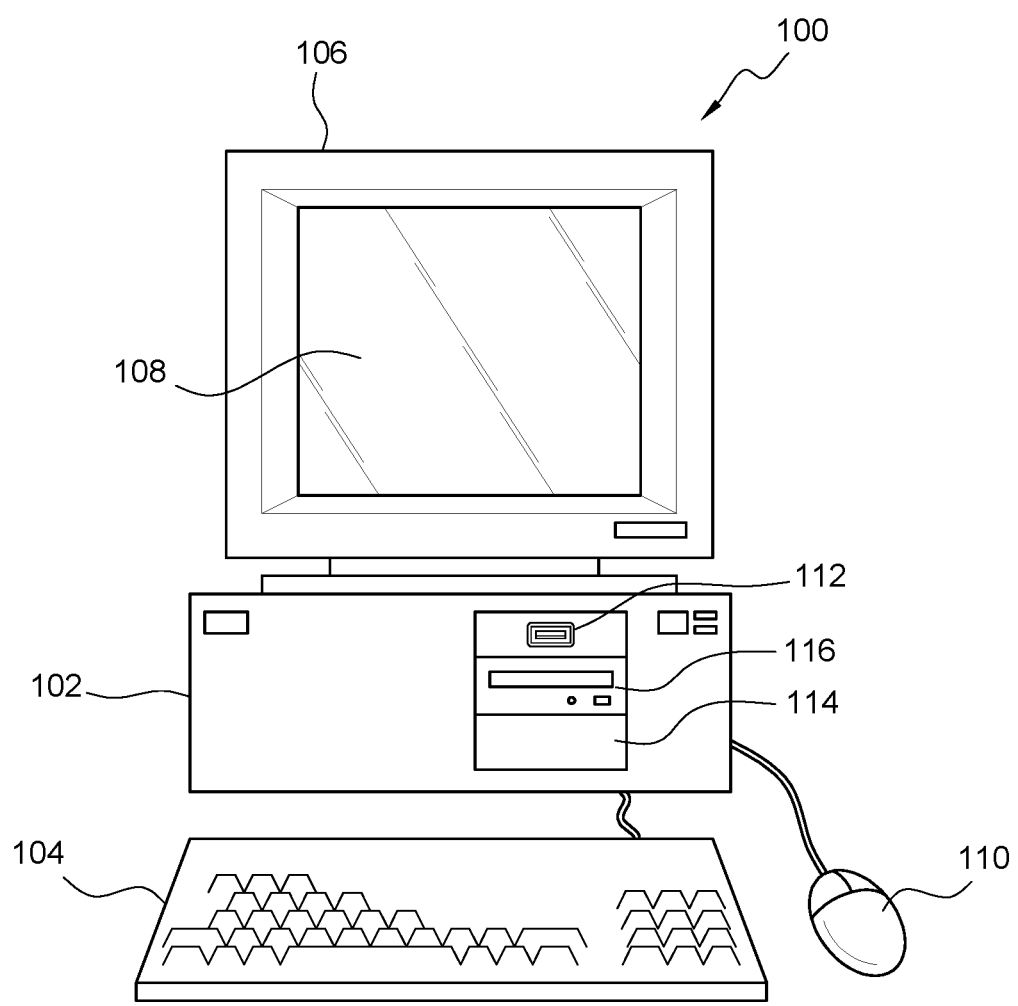
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real-time" encompasses operations that occur in "near" real-time or somewhat delayed from a triggering event. In a number of embodiments, "real-time" can mean real-time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately 0.1 second, 0.5 second, one second, two seconds, five seconds, or ten seconds, for example.

Description of Examples of Embodiments

Various embodiments include a computer-implemented method. The method can include determining whether a query is part of a conversation having a chat history before the query. When the query is part of the conversation, the method can include rephrasing the query, using a first large language model (LLM), based on context from the chat history. The method also can include determining, using a second LLM, whether or not the query is related to accommodations or disabilities. When the query is related to accommodations or disabilities, the method further can include determining one or more accommodations responsive to the query using a third LLM; and formulating a response to the query using a fourth LLM based on the one or more accommodations.

A number of embodiments include a system including one or more processors and one or more non-transitory computer-readable media storing computing instructions that, when executed on the one or more processors, cause the one or more processors to perform various operations. The operations can include determining whether a query is part of a conversation having a chat history before the query. When the query is part of the conversation, the operations can include rephrasing the query, using a first large language model (LLM), based on context from the chat history. The operations also can include determining, using a second LLM, whether or not the query is related to accommodations or disabilities. When the query is related to accommodations or disabilities, the operations further can include determining one or more accommodations responsive to the query using a third LLM; and formulating a response to the query using a fourth LLM based on the one or more accommodations.

Figure 2:
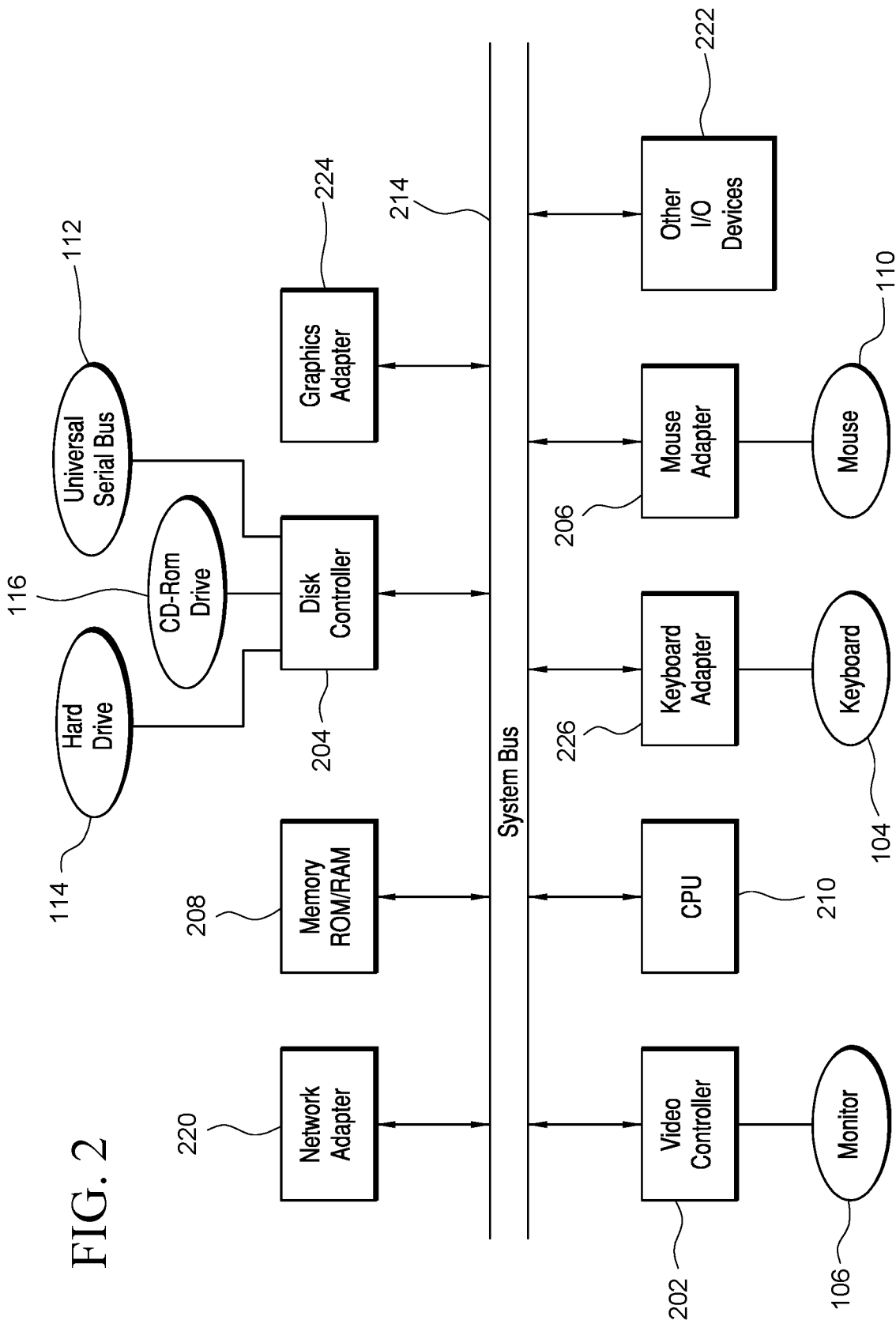
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can include one or more of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the WebOS operating system by LG Electronics of Seoul, South Korea, (iii) the Android™ operating system developed by Google, of Mountain View, California, United States of America, or (iv) the Windows Mobile™ operating system by Microsoft Corp. of Redmond, Washington, United States of America.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 1) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computer system 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
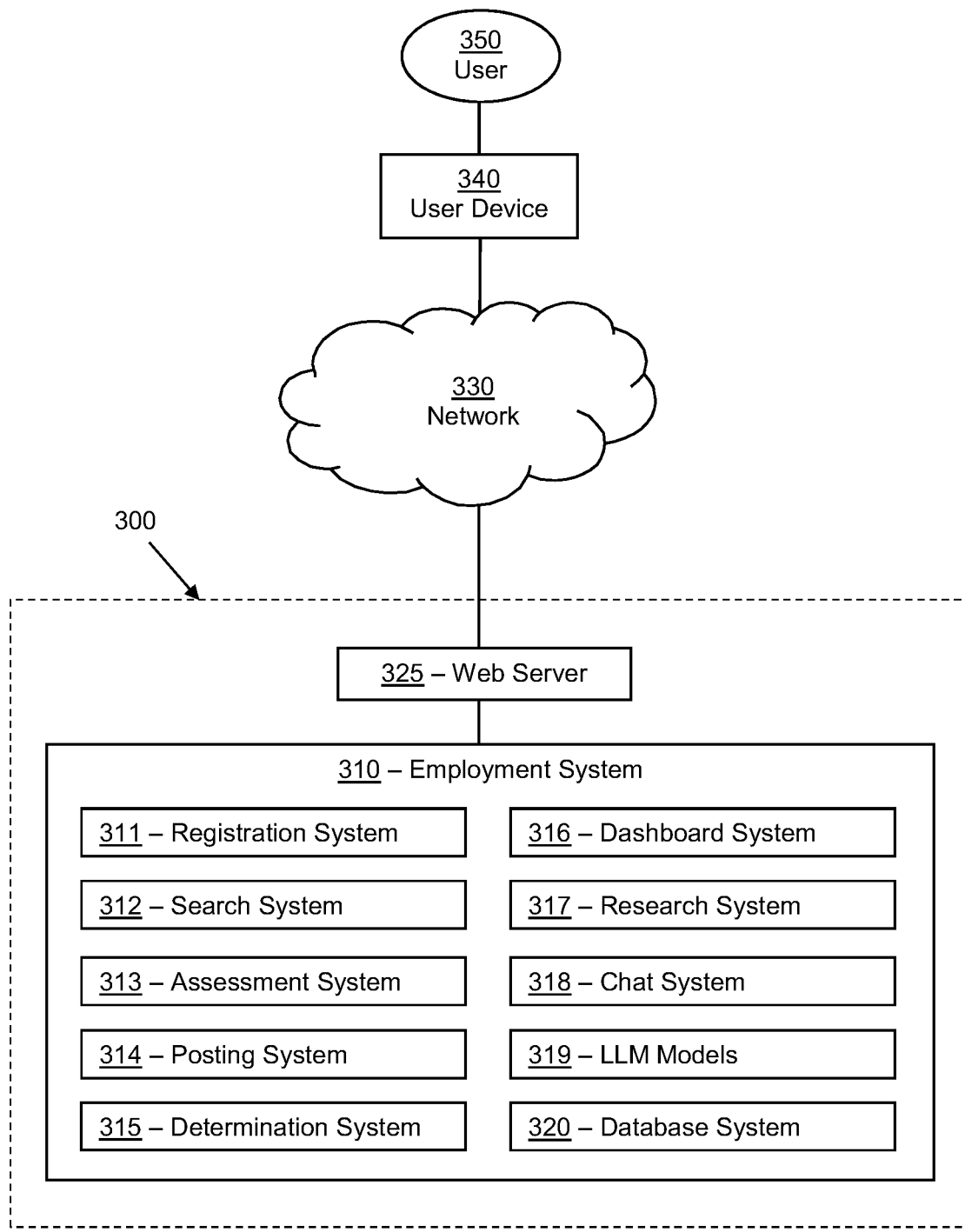
FIG. 3 illustrates a block diagram of a system for artificial intelligence models in an automated chat assistant determining workplace accommodations, according to an embodiment.

Turning ahead in the drawings, FIG. 3 illustrates a block diagram of a system 300 that can be employed for artificial intelligence models in an automated chat assistant determining workplace accommodations, according to an embodiment. System 300 is merely exemplary, and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. In some embodiments, system 300 can include an employment system 310 and/or web server 325.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

Employment system 310 and/or web server 325 can each be a computer system, such as computer system 100 (FIG. 1), as described above, and can each be a single computer, a single server, or a cluster or collection of computers or servers, or a cloud of computers or servers. In another embodiment, a single computer system can host employment system 310 and web server 325. In some embodiments, employment system 310 can be integrated with web server 325. Additional details regarding employment system 310 and/or web server 325 are described herein.

In some embodiments, web server 325 can be in data communication through a network 330 with one or more user devices, such as a user device 340. Network 330 can be the Internet or another network, such as an intranet or another suitable network. In a number of embodiments, the user devices (e.g., 340) can be used by users, such as a user 350. For example, users (e.g., 350) can include applicants (e.g., applicant 410 (FIG. 4), described below), employers (e.g., employer 510 (FIG. 5), described below), recruiters (e.g., recruiter 610 or sponsor 611 (FIG. 6), described below), researchers (e.g., researcher 710 (FIG. 7), described below), sponsors (e.g., recruiter 610 or sponsor 611 (FIG. 6), described below), and/or other suitable users.

In many embodiments, web server 325 can host one or more websites, one or more mobile application servers, one or more text messaging servers, and/or one or more other suitable servers or interfaces for communication with user device 340. For example, in some embodiments, web server 325 can communicate with users device 340 through an application programming interfaces (API). In many embodiments, user device 340 can include a web browser, which can be used to display webpages from the website hosted by system 300. For example, the web browser can include Google Chrome, Firefox, Internet Explorer, Opera, Safari, Microsoft Edge, or another suitable web browser. In the same or other embodiments, user device 340 can include a mobile application configured to communicate with a mobile application server in web server 325. In the same or other embodiments, user device 340 can include a text messaging application and/or other suitable communication applications for communication with web server 325.

In a number of embodiments, an internal network that is not open to the public can be used for communications between employment system 310 and web server 325 within system 300. Accordingly, in some embodiments, employment system 310 (and/or the software used by such systems) can refer to a back end of system 300 operated by an operator and/or administrator of system 300, and web server 325 (and/or the software used by such systems) can refer to a front end of system 300, as is can be accessed and/or used by one or more users, such as user 350, using user device 340. In these or other embodiments, the operator and/or administrator of system 300 can manage system 300, the processor(s) of system 300, and/or the memory storage unit(s) of system 300 using the input device(s) and/or display device(s) of system 300. In other embodiments, employment system 310 and web server 325 can communicate through a public network, such as the Internet.

In certain embodiments, the user devices (e.g., user device 340) can be desktop computers, laptop computers, mobile devices, and/or other endpoint devices used by one or more users (e.g., user 350). A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 1.6 kilograms (kg), 1.8 kg, 2.3 kg, 3.2 kg, and/or 4.5 kg.

Exemplary mobile devices can include (i) an iPod®, iPhone®, iTouch®, iPad®, MacBook® or similar product by Apple Inc. of Cupertino, California, United States of America, and/or (ii) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, California, United States of America, (ii) the Android™ operating system developed by the Open Handset Alliance, or (iii) the Windows Mobile™ operating system by Microsoft Corp. of Redmond, Washington, United States of America.

In many embodiments, employment system 310 and/or web server 325 can each include one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to employment system 310 and/or web server 325 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor (s) and/or the memory storage unit(s). In some embodiments, the KVM switch also can be part of employment system 310 and/or web server 325. In a similar manner, the processors and/or the non-transitory computer-readable media can be local and/or remote to each other.

Meanwhile, in many embodiments, employment system 310 and/or web server 325 also can be configured to communicate with one or more databases, such as a database system 320. The one or more databases can include medical disorder data, job codes data, job openings posted by employers, for example, and other suitable. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP Database, and IBM DB2 Database.

Meanwhile, communication between employment system 310 and/or web server 325, and/or the one or more databases can be implemented using any suitable manner of wired and/or wireless communication. Accordingly, system 300 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In some embodiments, employment system 310 can include a registration system 311, a search system 312, an assessment system 313, a posting system 314, a determination system 315, a dashboard system 316, a research system 317, a chat system 318, large language models (LLM) 319, a database system 320, and/or other suitable systems and/or databases. In many embodiments, the systems of employment system 310 can be modules of computing instructions (e.g., software modules) stored at non-transitory computer readable media that operate on one or more processors. In the same or other embodiments, one of more of the systems of employment system 310 can be implemented in hardware. The systems of employment system 310 described herein are merely exemplary, and other suitable arrangements of systems within employment system 310 are contemplated. The systems of employment system 310 are described below in further detail.

Figure 4:
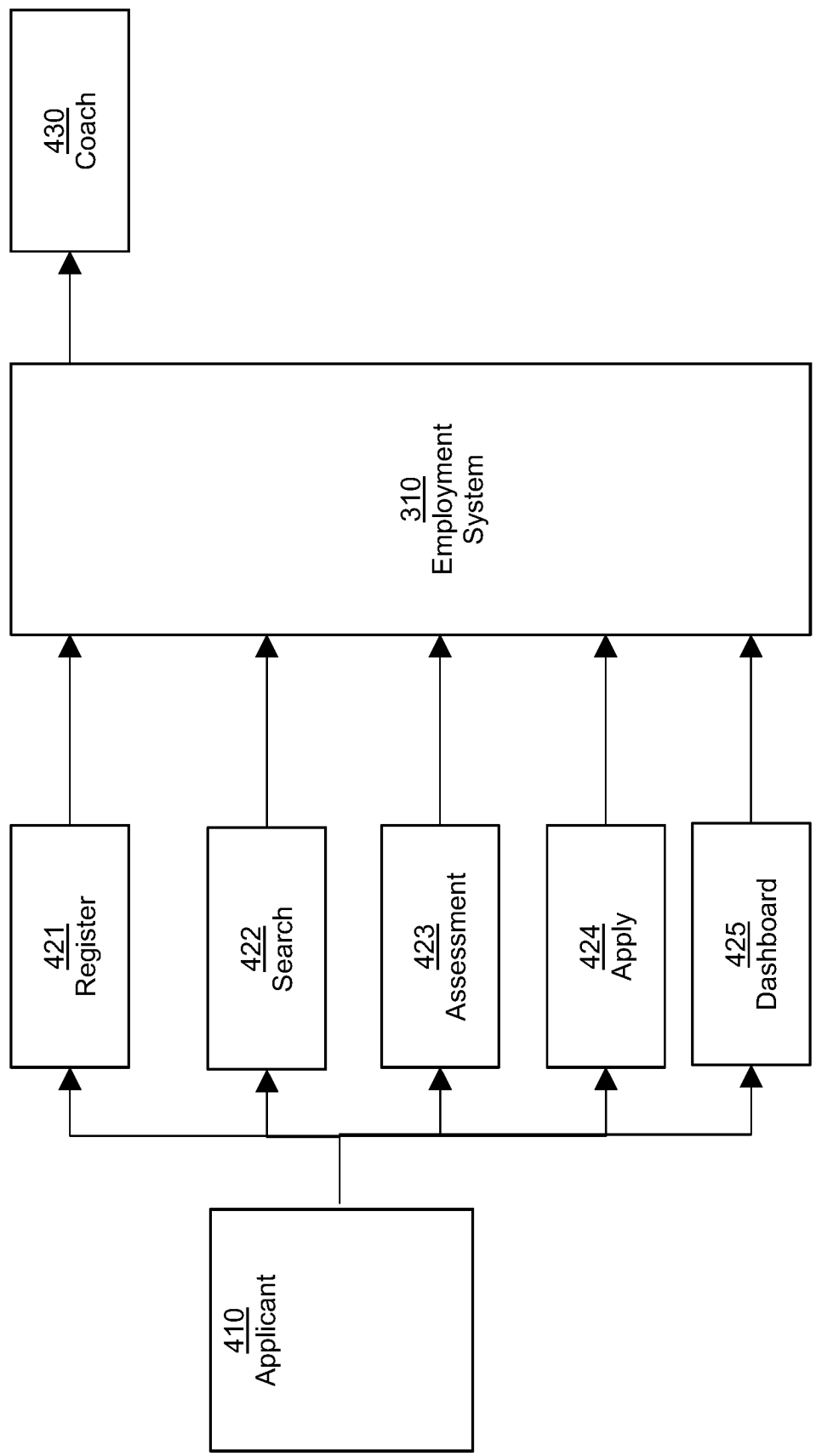
FIG. 4 illustrates a flow diagram showing activities that can be performed by the employment system of FIG. 3 when the employment system of FIG. 3 is used by an applicant.

Turning ahead in the drawings, FIG. 4 illustrates a flow diagram showing activities that can be performed by employment system 310 when employment system 310 is used by an applicant 410. The activities shown in FIG. 4 are merely exemplary, and the activities that can be performed by employment system 310 are not limited to the activities presented herein. "Applicant(s)" (e.g., 410) can include individuals and/or entities seeking a job position, such as seeking a suitable job position through employment system 310. "Job position" can be used interchangeably with other terms, such as "job," "position," "employment," or "career," and can include any form of work arrangement, including full-time employment, part-time employment, fixed-term work, temporary work, apprenticeships, internships, contract work, on-call work, and/or other suitable work arrangements, and can include paid and/or unpaid work arrangements.

In many embodiments, as shown in FIG. 4, employment system 310 can be used by applicant 410 to perform an activity 421 of registering with employment system 310. In some embodiments, registration system 311 (FIG. 3) can perform activity 421. For example, applicant 410 can create an account in employment system 310 and/or setup a username and password. As another example, applicant 410 can setup a profile in employment system 310. In some embodiments, setting up a profile can include applicant 410 inputting information into employment system 310 about applicant 410, including information about the abilities and/or disabilities of applicant 410, and/or requested accommodations.

In some embodiments, applicant 410 can request information about accommodations through chat system 318 (FIG. 3), which can allow applicant 410 to query about disabilities or accommodations for such disabilities. In some embodiments, employment system 310 can determine the success enablers in response to the query and/or respond to the applicant 410 with information about the success enablers, such as described below in further detail in connection with FIG. 8. As used herein, the term "success enablers" can be used to refer to accommodations, such as workplace accommodations (although not limited to workplace), which can enable success for applicants with one or more disabilities. In a number of embodiments, the success enablers can be added to the profile of applicant 410. In some embodiments, chat system 318 (FIG. 3) can be provide a question answering system, such as through a conversational chat interface, to applicant 410, which can allow for applicant 410 to submit queries to chat system 318 (FIG. 3) and receive responses from chat system 318. In a number of embodiments, chat system 318 (FIG. 3) can use determination system 315 (FIG. 3) to determine responses to the queries, which can include determining responses based on the query and the chat history in the conversation, such that the latest query is interpreted in the context of the chat history. In several embodiments, determination system 315 (FIG. 3) can use LLM models 319 (FIG. 3) when determining responses to queries. LLM models 319 (FIG. 3) can includes one or more LLMs. For example, OpenAI's GPT-3, GPT 3.5, GPT4, and/or other suitable LLMs can be used for text generation. As another example, Open AI's Ada model, the sentence-transformers Python library, or another suitable embeddings LLM, can be used for generating embedding vectors. Many embodiments include a specific arrangement of multiple LLMs.

In several embodiments, employment system 310 can be used by applicant 410 to perform an activity 422 of searching for job postings. In some embodiments, search system 312 (FIG. 3) can perform activity 422. In a number of embodiments, applicant 410 can search for job postings related to one or more accommodations and/or disabilities of applicant 410. In certain embodiments, for example, applicant 410 can perform a search for job postings using employment system 310 based on search options related to one or more abilities, disabilities, disorders, accommodations, medical conditions, etc. In many embodiments, job postings can be presented to applicant 410 in order of priority and/or relevance based on the abilities of applicant 410, and/or based on success enablers added to the profile of applicant 410.

In many embodiments, employment system 310 can be used by applicant 410 to perform an activity 423 of completing or partially completing an assessment. In several embodiments, assessment system 313 (FIG. 3) perform activity 423. In a number of embodiments, the assessment can be used by employment system 310 to determine the abilities and/or disabilities of applicant 410 to perform various skills and/or tasks. In many embodiments, employment system 310 can present applicant 410 with a series of questions to perform a self-assessment.

In several embodiments, employment system 310 can be used by applicant 410 to perform an activity 424 of applying for job openings through employment system 310. In some embodiments, posting system 314 (FIG. 3) can perform activity 424. In many embodiments, if applicant 410 uses employment system 310 to search for job openings and finds one or more job postings that are relevant or suitable for applicant 410, applicant 410 can apply for those job positions. Employment system 310 can notify employers (e.g., 510 (FIG. 5), described below)) that posted those job postings of the applications by applicant 410.

In many embodiments, employment system 310 can be used by applicant 410 to perform an activity 425 of displaying a dashboard. In some embodiments, dashboard system 316 (FIG. 3) can perform activity 425. In a number of embodiments, the dashboard can be provided to applicant 410 to monitor the status of the pending job applications and/or view other information or analytics regarding use of employment system 310 by applicant 410. In many embodiments, the success enablers that have been added to the profile can be displayed on the dashboard.

In some embodiments, employment system 310 can provide various outputs to applicant 410 in addition to, or alternative to, the information provided to applicant 410 as described above in connection with activities 421-425. As an example, employment system 310 can perform an activity 430 of coaching to applicant 410. For example, employment system 310 can provide guidance to applicant 410 and/or can match applicant 410 with a coach to provide coaching to applicant 410 through the job search process. The coaching and/or guidance can assist applicant 410 with preparing a resume, accommodation request, and/or cover letter, preparing for a job interview, and/or preparing for working at the job position, depending on the abilities and/or disabilities of applicant 410.

Figure 5:
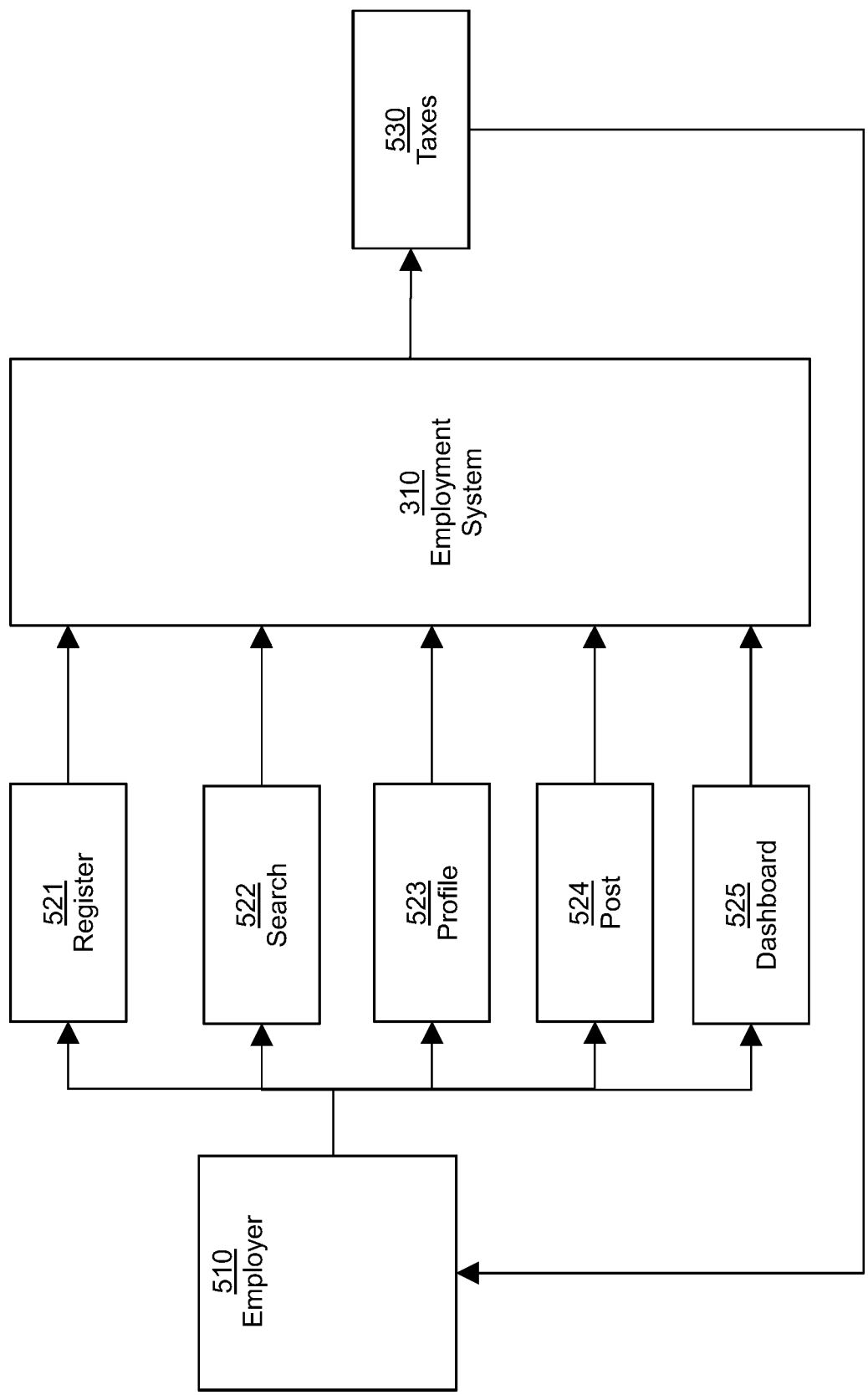
FIG. 5 illustrates a flow diagram showing activities that can be performed by the employment system of FIG. 3 when the employment system of FIG. 3 is used by an employer.

Turning ahead in the drawings, FIG. 5 illustrates a flow diagram showing activities that can be performed by employment system 310 when employment system 310 is used by an employer 510. The activities shown in FIG. 5 are merely exemplary, and the activities that can be performed by employment system 310 are not limited to the activities presented herein. "Employer(s)" (e.g., 510) can include individuals and/or entities offering one or more job positions, such as offering one or more job positions through one or more job postings on employment system 310.

In many embodiments, as shown in FIG. 5, employment system 310 can be used by employer 510 to perform an activity 521 of registering with employment system 310. In some embodiments, registration system 311 (FIG. 3) can perform activity 521. For example, employer 510 can create an account in employment system 310 and/or setup a username and password.

In a number of embodiments, employment system 310 can be used by employer 510 to perform an activity 522 of searching for applicants and/or job postings using employment system 310. In some embodiments, search system 312 (FIG. 3) can perform activity 522. For example, employer 510 can use employment system 310 to find applicants (e.g., 410 (FIG. 4)) using search options related to one or more abilities, disabilities, disorders, accommodations, etc., and/or to see other job postings that are already posted by the same or other employers (e.g., 510).

In many embodiments, employment system 310 can be used by employer 510 to perform an activity 523 of creating and/or updating a profile for employer 510 on employment system 310. In some embodiments, registration system 311 (FIG. 3) can perform activity 523. In a number of embodiments, the profile can include suitable information about employer 510, such as the culture of employer 510, the mission of employer 510, benefits offered by employer 510, industries served by of employer 510, human resources contacts at employer 510, and/or other suitable information about employer 510.

In some embodiments, employment system 310 can be used by employer 510 to perform an activity 524 of posting one or more job openings on employment system 310. In some embodiments, posting system 314 (FIG. 3) can perform activity 524. For example, employer 510 can create one or more job postings for job positions offered by employer 510, which express the accommodations available and/or abilities required for the specific position and location.

In many embodiments, employment system 310 can be used by employer 510 to perform an activity 525 of displaying a dashboard. In some embodiments, dashboard system 316 (FIG. 3) can perform activity 525. In a number of embodiments, the dashboard can be provided to employer 510 to monitor the status of the job postings posted by employer 510. For example, employer 510 can access information and/or analytics about applicants (e.g., 410 (FIG. 4)) who have viewed and/or applied for the job postings. As another example, employer 510 can access the applications submitted for the job postings.

In some embodiments, employment system 310 can provide various outputs to employer 510 in addition to, or alternative to, the information provided to employer 510 as described above in connection with activities 521-525. As an example, employment system 310 can perform an activity 530 of providing employer 510 with the ability to apply for one or more tax credits after employer 510 has hired an applicant with a disability.

Figure 6:
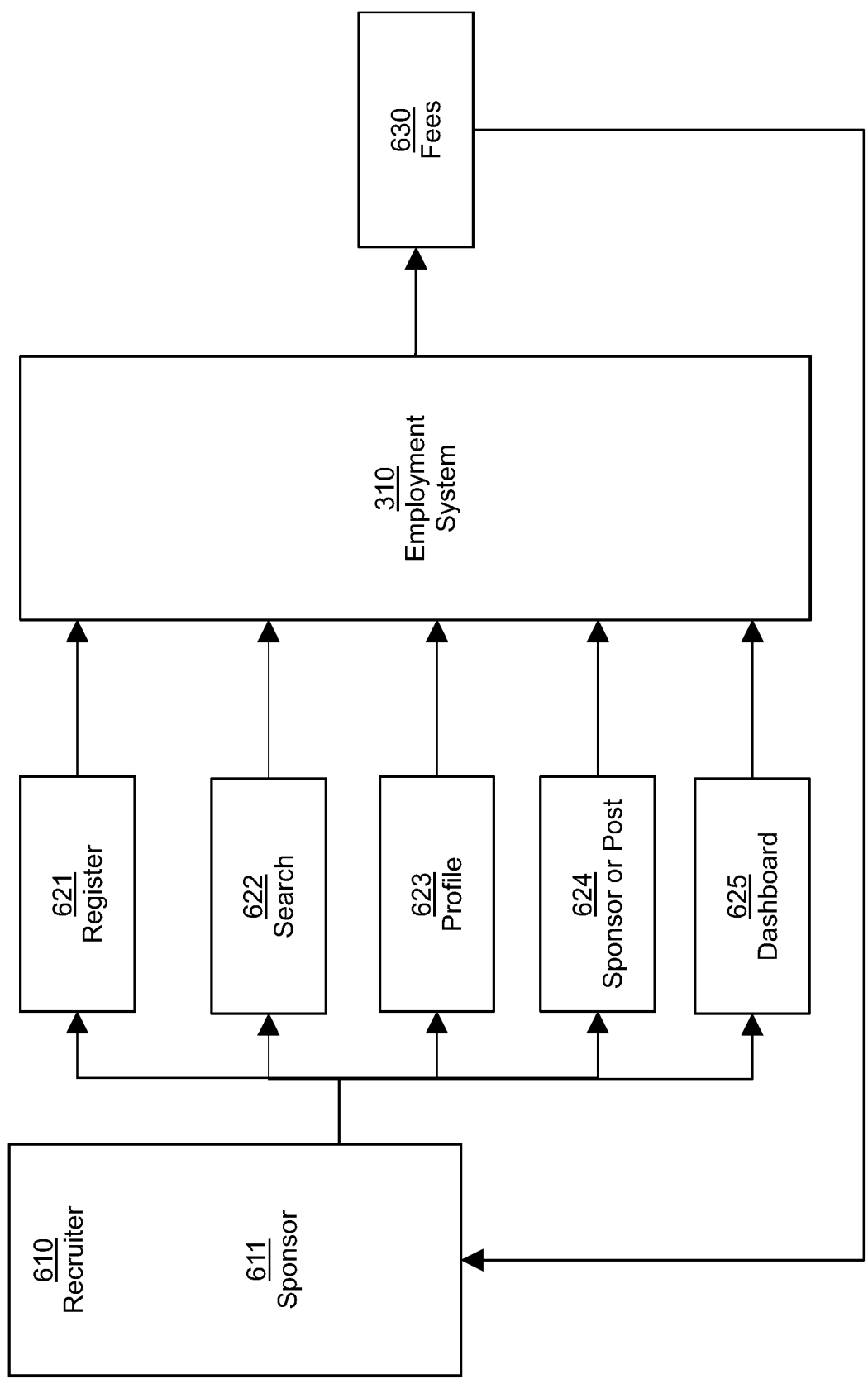
FIG. 6 illustrates a flow diagram showing activities that can be performed by the employment system of FIG. 3 when the employment system of FIG. 3 is used by a recruiter and/or a sponsor.

Turning ahead in the drawings, FIG. 6 illustrates a flow diagram showing activities that can be performed by employment system 310 when employment system 310 is used by a recruiter 610 and/or sponsor 611. The activities shown in FIG. 6 are merely exemplary, and the activities that can be performed by employment system 310 are not limited to the activities presented herein. "Recruiter(s)" (e.g., 610) can include individuals and/or entities representing employers in identifying applicants (e.g., 410 (FIG. 4)) for a job position and/or representing applicants in identifying job positions for applicants. "Sponsor(s)" (e.g., 611) can include individuals and/or entities, such as foundations, agencies (e.g., federal, state, etc.), and/or other suitable sponsors, who can provide funds, goods, and/or services for applicants, employers, recruiters, and/or job positions. For example, a foundation for multiple sclerosis can recruit applicants who have multiple sclerosis, and/or can sponsor job positions suitable for applicants with multiple sclerosis.

In many embodiments, as shown in FIG. 6, employment system 310 can be used by recruiter 610 and/or sponsor 611 to perform an activity 621 of registering with employment system 310. In some embodiments, registration system 311 (FIG. 3) can perform activity 621. For example, recruiter 610 and/or sponsor 611 can create an account in employment system 310 and/or setup a username and password.

In a number of embodiments, employment system 310 can be used by recruiter 610 and/or sponsor 611 to perform an activity 622 of searching for applicants and/or job postings using employment system 310. In some embodiments, search system 312 (FIG. 3) can perform activity 622. For example, recruiter 610 and/or sponsor 611 can use employment system 310 to search for job postings using employment system 310 based on search options related to one or more abilities, disabilities, disorders, accommodations, medical conditions, etc., to find applicants (e.g., 410 (FIG. 4)) using search options related to one or more abilities, disabilities, disorders, accommodations, etc., and/or to see other job postings that have been posted by employers (e.g., 510).

In many embodiments, employment system 310 can be used by recruiter 610 and/or sponsor 611 to perform an activity 623 of creating and/or updating a profile for recruiter 610 and/or sponsor 611 on employment system 310. In some embodiments, registration system 311 (FIG. 3) can perform activity 623. In a number of embodiments, the profile can include suitable information about recruiter 610 and/or sponsor 611, and/or information about the services and/or funding offered by recruiter 610 and/or sponsor 611.

In some embodiments, employment system 310 can be used by recruiter 610 and/or sponsor 611 to perform an activity 624 of posting information about a sponsorship and/or post one or more job openings on employment system 310. In some embodiments, posting system 314 (FIG. 3) can perform activity 624. For example, sponsor 611 can sponsor a job position and/or an applicant (e.g., 410 (FIG. 4)). As another example, recruiter 610 can post a job posting on behalf of an employer (e.g., 510 (FIG. 5)).

In many embodiments, employment system 310 can be used by employer 510 to perform an activity 625 of displaying a dashboard. In some embodiments, dashboard system 316 (FIG. 3) can perform activity 625. In a number of embodiments, the dashboard can be provided to recruiter 610 and/or sponsor 611 to monitor the status of the applicants (e.g., 410 (FIG. 4)) and/or the job postings associated with recruiter 610 and/or sponsor 611. For example, recruiter 610 and/or sponsor 611 can access information and/or analytics about the applicants (e.g., 410 (FIG. 4)) who have viewed and/or applied for a job posting. As another example, For example, recruiter 610 and/or sponsor 611 can access information and/or analytics about which job postings have be viewed and/or applied for by an applicant (e.g., 410 (FIG. 4)) who was recruited by recruiter 610 and/or sponsored by sponsor 611.

In some embodiments, employment system 310 can provide various outputs to recruiter 610 and/or sponsor 611 in addition to, or alternative to, the information provided to recruiter 610 and/or sponsor 611 as described above in connection with activities 621-625. As an example, employment system 310 can perform an activity 630 of providing recruiter 610 with an allocated fee based on the services provided by recruiter 610 when an applicant (e.g., 410 (FIG. 4)) starts a job at an employment for which recruiter 610 represented employer 510 in posting the job and/or recruiting the applicant (e.g., 410 (FIG. 4)) to the job posting.

Figure 7:
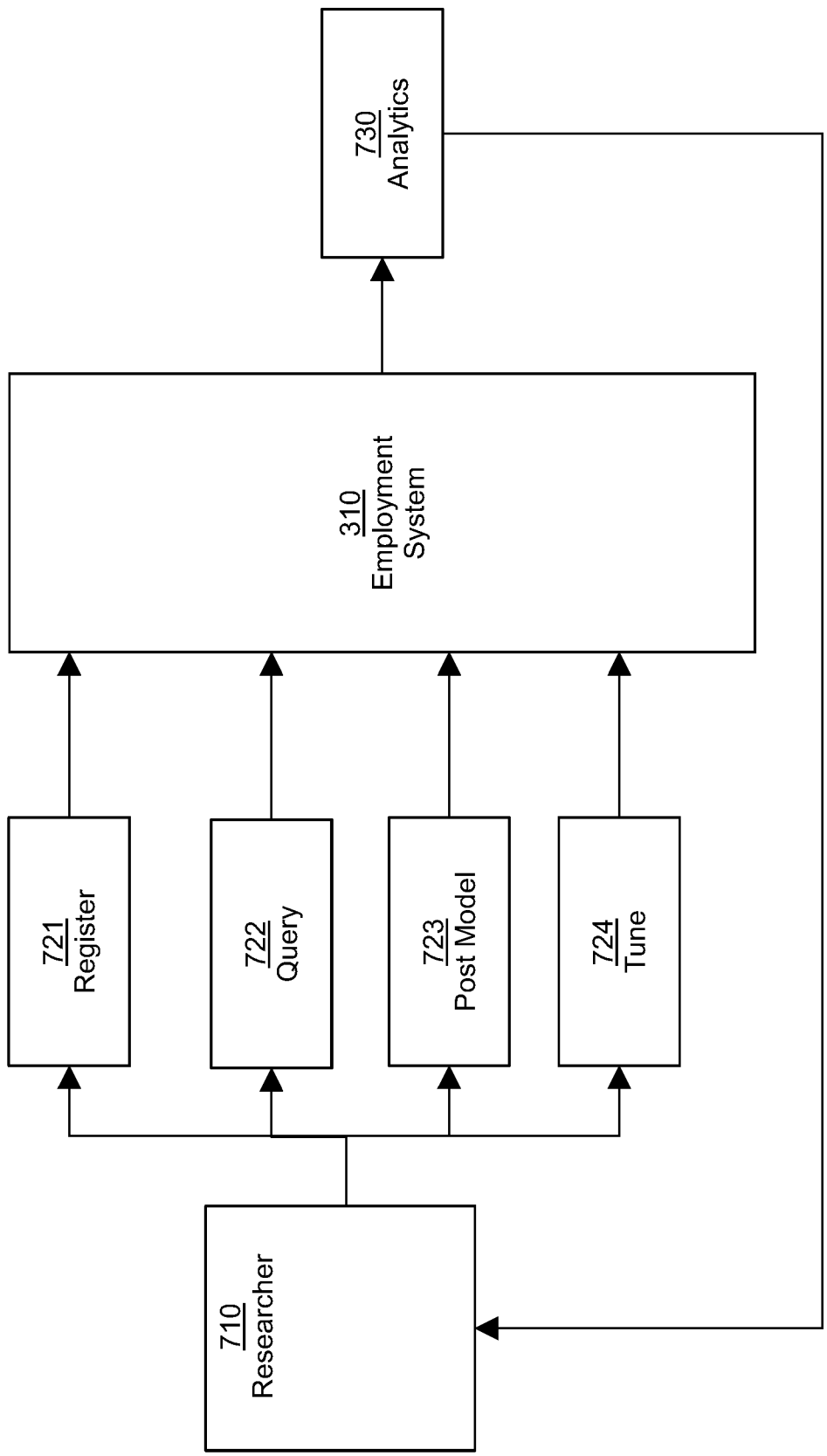
FIG. 7 illustrates a flow diagram showing activities that can be performed by the employment system of FIG. 3 when the employment system of FIG. 3 is used by a researcher.

Turning ahead in the drawings, FIG. 7 illustrates a flow diagram showing activities that can be performed by employment system 310 when employment system 310 is used by a researcher 710. The activities shown in FIG. 7 are merely exemplary, and the activities that can be performed by employment system 310 are not limited to the activities presented herein. "Researcher(s)" (e.g., 710) can include to individuals and/or entities that interact with employment system 310 to access information and/or update models in employment system 310, such as to tune employment system 310.

In many embodiments, as shown in FIG. 7, employment system 310 can be used by researcher 710 to perform an activity 721 of registering with employment system 310. In some embodiments, registration system 311 (FIG. 3) can perform activity 721. For example, researcher 710 can create an account in employment system 310 and/or setup a username and password.

In several embodiments, employment system 310 can be used by researcher 710 to perform an activity 722 of querying employment system 310 for information. In some embodiments, research system 317 (FIG. 3) can perform activity 722. In a number of embodiments, research 710 can query information such as statistics about applicants (e.g., 410 (FIG. 4)) finding job openings using employment system 310, internal calculations and/or scoring of models, and/or other suitable information.

In many embodiments, employment system 310 can be used by researcher 710 to perform an activity 723 of posting a model that can be used by employment system 310. In some embodiments, research system 317 (FIG. 3) can perform activity 723. For example, the calculations and/or scoring procedures that are done by employment system 310 in matching applicants (e.g., 410 (FIG. 4)) to job openings based on abilities and/or accommodations can be updated by positing a new model.

In a number of embodiments, employment system 310 can be used by researcher 710 to perform an activity 724 of tuning the model by updating the model. In some embodiments, research system 317 (FIG. 3) can perform activity 724. For example, when a model is posted, A/B testing can be performed using the model, and information can be determined by querying employment system 310 and/or analyzing the results of the A/B testing, which can be used by the research to further tune the model.

In some embodiments, employment system 310 can provide various outputs to researcher 710 in addition to, or alternative to, the information provided to researcher 710 as described above in connection with activities 721-725. As an example, employment system 310 can provide researcher 710 with analytics regarding the model, the results of A/B testing, and/or other suitable information.

Figure 8:
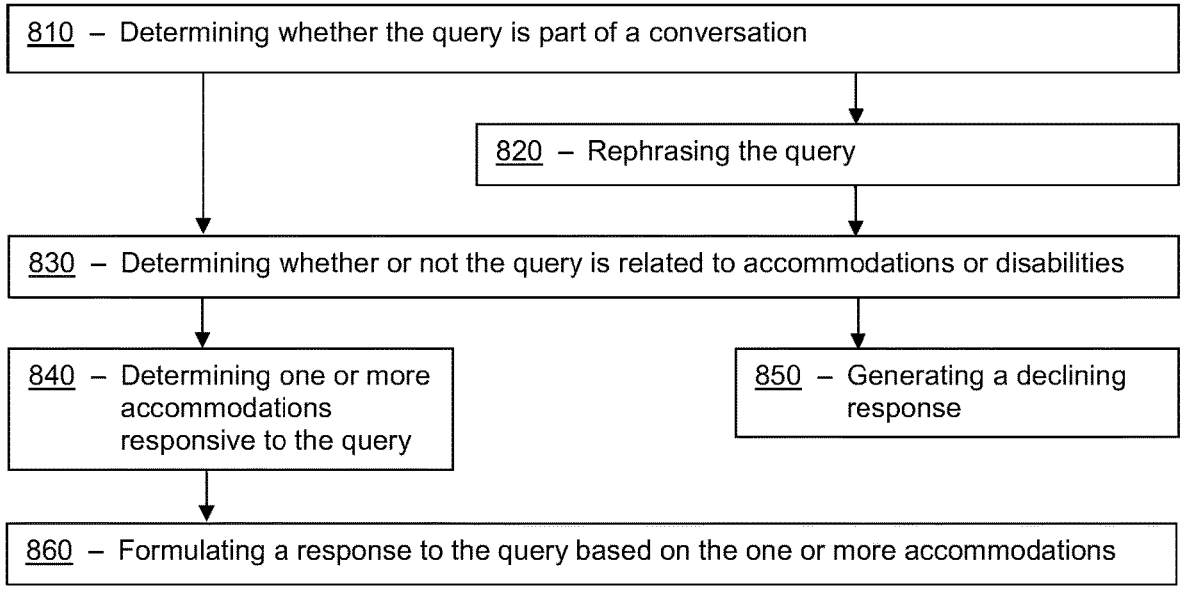
FIG. 8 illustrates a flow chart for a method of using artificial intelligence models in an automated chat assistant determining workplace accommodations, according to an embodiment.

Turning ahead in the drawings, FIG. 8 illustrates a flow chart for a method 800 of using artificial intelligence models in an automated chat assistant determining workplace accommodations, according to an embodiment. Method 800 is merely exemplary and is not limited to the embodiments presented herein. Method 800 can be employed in many different embodiments or examples not specifically depicted or described herein. In some embodiments, the procedures, the processes, and/or the activities of method 800 can be performed in the order presented. In other embodiments, the procedures, the processes, and/or the activities of method 800 can be performed in any suitable order. In still other embodiments, one or more of the procedures, the processes, and/or the activities of method 800 can be combined or skipped.

In many embodiments, system 300 (FIG. 3), employment system 310 (FIG. 3), and/or web server 325 (FIG. 3) can be suitable to perform method 800 and/or one or more of the activities of method 800. In several embodiments, method 800 can be performed using determination system 315 (FIG. 3), chat system 318 (FIG. 3), LLM models 319 (FIG. 3), and/or other suitable systems. In these or other embodiments, one or more of the activities of method 800 can be implemented as one or more computing instructions configured to run at one or more processors and configured to be stored at one or more non-transitory computer readable media. Such non-transitory computer readable media can be part of system 300 (FIG. 3), employment system 310 (FIG. 3), and/or web server 325 (FIG. 3). The processor(s) can be similar or identical to the processor(s) described above with respect to computer system 100 (FIG. 1).

In some embodiments, method 800 and other activities in method 800 can include using a distributed network including distributed memory architecture to perform the associated activity. This distributed architecture can reduce the impact on the network and system resources to reduce congestion in bottlenecks while still allowing data to be accessible from a central location.

Referring to FIG. 8, method 800 can include an activity 810 of determining whether a query is part of a conversation having a chat history before the query. In some embodiments, the query can be a query received at employment system 310 (FIG. 3) from a user 350 (FIG. 3). For example, applicant 410 can use chat system 318 to input a query. In some cases, the query can be part of a larger conversation, such as an existing chat history. Activity 810 can involve determining whether the query is the first query submitted in a new conversation, the flow of method 800 can proceed to an activity 830, in which case the query, as submitted, can be used in activity 830, as described below. When the query is part of an existing chat, the flow of method 800 can proceed to an activity 820, as described below.

In several embodiments, when the query is part of the conversation, method 800 can include activity 820 of rephrasing the query, using a first LLM, based on context from the chat history. In some embodiments, the first LLM can be a text-generation LLM, such as OpenAI's GPT-3, GPT 3.5, GPT4, and/or another suitable LLM. When the query is part of an existing chat, the query can be passed to the first LLM to rephrase the question to take into account the chat history. For example, assume the user previously asked for success enablers for people with anxiety disorder, and the chat recommended frequent breaks, emotional support animals, and apps for stress. If the user then asks, "Tell me more about the last one", the first LLM can use this query and the chat history to rephrase the question to say, "Tell me about apps for stress" and pass use that updated query in activity 830, described below. In some cases, the chat history can be too lengthy to be included in the LLM prompt based on a limited input size of the LLM, in which case the chat history can first be summarized.

Activity 820 can allow the chat to use short-term memory in order to have a "conversation" with the user, since LLMs are not inherently capable of having memory. In many embodiments, the first LLM is not fine-tuned for this task. An example of a prompt that can be used to the first LLM to generate the rephrased query is as follows (but this prompt is merely exemplary, and prompts can change from time to time based on the type of LLM being used):

"Given the following conversation and a follow-up question, rephrase the question to be a standalone question."
[The chat history is included as the conversation, and the query is included as the follow-up question.]

In a number of embodiments, method 800 additionally can include activity 830 of determining, using a second LLM, whether or not the query is related to accommodations or disabilities. Activity 830 can occur after activity 810 and/or activity 820. The output of the second LLM can be binary (e.g., True/False or 0/1 or a probability bounded by 0 and 1 with a cut-off threshold (e.g., 0.5) used to provide a binary output from the probability).

In some embodiments, the second LLM is (a) pre-trained on a corpus, and/or and (b) fine-tuned to predict a respective new token representing a respective binary classification output in response to a respective query. In some embodiments, the second LLM is fine-tuned by passing parameters of the second LLM through multiple neural network linear layers, using gradient descent and/or backpropagation, to update the parameters of the second LLM.

For example, in many embodiments, the second LLM is fine-tuned (such as prior to being used in activity 830) to operate as a binary classifier. In order to determine whether to run a search for success enablers, the classifier can determine if the query is related to workplace accommodations or not. To fine-tune the model, training data can be created by a human, providing example prompts and completions. Because the second LLM is pre-trained on a large English language corpus, its task is to predict the next token in a sequence, also known as text generation. To create the training data, a prompt is used instructing the second LLM to classify the query plus a sample user question. A completion is human-labeled to indicate True or False, True meaning that a search for success enablers should be run because the question is about workplace accommodations. Here are two examples of one training prompt and completion, the first illustrating that a question about using a wheelchair is about workplace accommodations, and the second illustrating that a question about the capital of France is not about workplace accommodations:

{"messages":[{"role":"system","content":"Your job is to determine if a sentence is referring to workplace accommodations. Accommodations can include any of disabilities, illnesses, religious beliefs, gender identity, or other personal needs. If the question or statement is about disabilities and/or workplace accommodations, answer True. Otherwise, answer False."},
{"role":"user","content":"What if I use a wheelchair?"},
{"role":"assistant","content":"True"}]}
{"messages":[{"role":"system","content":"Your job is to determine if a sentence is referring to workplace accommodations. Accommodations can include any of disabilities, illnesses, religious beliefs, gender identity, or other personal needs. If the question or statement is about disabilities and/or workplace accommodations, answer True. Otherwise, answer False."},
{"role":"user","content":"What is the capital of France?"},
{"role":"assistant","content":"False"}]}

The process of fine-tuning the second LLM can involve taking an LLM pre-trained on a very large corpus to predict the next token given the tokens that preceded it. Here, tokens refer to words and word pieces that the computer uses to put language together and is the result of standard algorithms. In order to fine-tune the second LLM to output a specific token (answer), after preparing the dataset, the second LLM can be loaded and passed through several neural network linear layers, using gradient descent and then backpropagation, to update the model's weights and biases (collectively, the model's parameters). For example, PyTorth and/or TensorFlow can be used to such training. Once the model's parameters have been updated and the training results evaluated, the model is now adapted to this use case and can perform well with minimal prompting. When the output of activity 830 is True, the flow of method 800 can continue to an activity 840, described below, but when the output of activity 840 is False, the flow of method 800 can continue to activity 850, described below.

In several embodiments, when the query is related to accommodations or disabilities, method 800 can include activity 840 of determining one or more accommodations responsive to the query using a third LLM. In many embodiments, activity 840 can occur after activity 830. In many embodiments, the third LLM can be an embeddings LLM.

Figure 9:
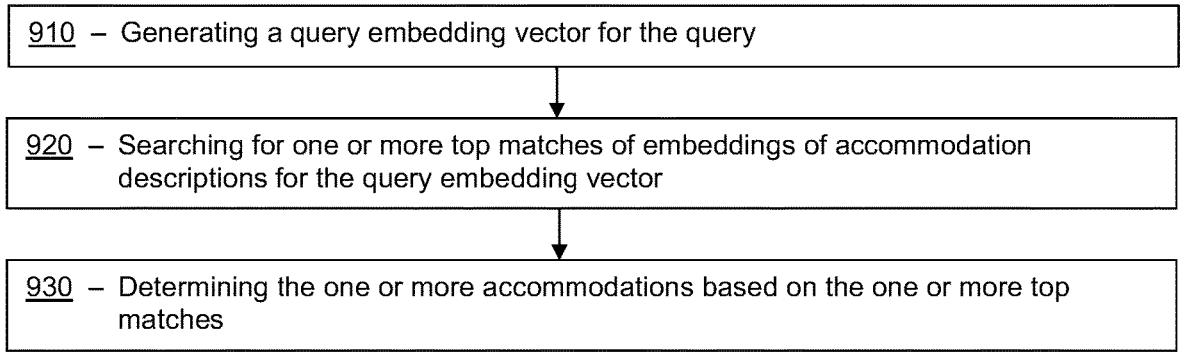
FIG. 9 illustrates a flow chart for an activity of determining one or more accommodations responsive to the query using a third LLM, according to the embodiment of FIG. 8.

Turning ahead in the drawings, FIG. 9 illustrates a flow chart for activity 840 of determining one or more accommodations responsive to the query using a third LLM. Activity 840 is merely exemplary and is not limited to the embodiments presented herein. Activity 840 can be employed in many different embodiments or examples not specifically depicted or described herein. In some embodiments, the procedures, the processes, and/or the activities of activity 840 can be performed in the order presented. In other embodiments, the procedures, the processes, and/or the activities of activity 840 can be performed in any suitable order. In still other embodiments, one or more of the procedures, the processes, and/or the activities of activity 840 can be combined or skipped.

In a number of embodiments, activity 840 can include an activity 910 of generating a query embedding vector for the query using the embeddings LLM. If the second LLM returned 'True', an embedding for the query can be created using the third LLM, which can be an embeddings LLM, such as OpenAI's Ada model or the sentence-transformers Python library, or another suitable embeddings LLM. In some embodiments, this model is not fine-tuned. The output can be an embedding vector that represents the query.

In several embodiments, activity 840 also can include an activity 920 of searching for one or more top matches of embeddings of accommodation descriptions with respect to the query embedding vector. For example, the query embedding vector generated in activity 910 can be sent to a vector database, in which vector embeddings of the various success enabler descriptions are stored. The top matches between the query embedding vector and the vector embeddings in the vector database can be determined in activity 920. In some embodiments, activity 920 can include calculating a respective distance metric between each of the embeddings of accommodation descriptions and the query embedding vector. The distance metric can be determine using a dot product, cosine similarity, Euclidean distance, or another suitable approach. The top matches can be those vector embeddings with the shortest distance metrics. For example, the top 1, 2, 3, 4, 5, or other suitable number of matches can be determined. In some embodiments, those vector embeddings with a distance metric below a predetermined threshold can be included in the top matches. In some embodiments, Pinecone or another vector database for vector search can be used to perform activity 920.

In various embodiments, activity 840 additionally can include an activity 930 of determining the one or more accommodations based on the one or more top matches. The one or more accommodations can be those corresponding to the vector embeddings of the descriptions of such accommodations. In some embodiments, these accommodations (success enablers) can be displayed to the user and/or the user can be presented with the option of adding such success enablers to the profile of the user in employment system 310. In many embodiments, after performing activity 840, the flow of method 800 can continue to an activity 860, described below.

Returning to FIG. 8, in a number of embodiments, when the query is not related to accommodations or disabilities, method 800 can include activity 850 of generating a declining response using a text-generation LLM. In many embodiments, activity 850 can occur after activity 830. For example, if the second LLM in activity 820 returned 'False', then activity 840 is not performed, and the query can be passed to a text-generation LLM to provide the declining response to the user. In many embodiments, the text-generation LLM is not fine-tuned. An example of a prompt provided to the text-generation LLM is as follows:

"The following is a friendly conversation between a human and an AI.

The human is trying to find information about accommodations at work.

If the human asks about anything other than disabilities or workplace accommodations, politely tell them that you cannot help them. Conclude by telling them to type "exit" to leave the chat. \n\n Current conversation: \n{chat_history}"

In this example prompt, "chat_history" is a variable representation a text representation of the conversation so far, which can be kept in cache memory until the conversation ends.

In several embodiments, method 800 further can include an activity 860 of formulating a response to the query using a fourth LLM based on the one or more accommodations. In many embodiments, activity 860 can occur after activity 840. In a number of embodiments, the fourth LLM can be a text-generation LLM.

In a number of embodiments, the accommodations (success enablers) can be returned to the user and/or passed to the fourth LLM along with the query. The fourth LLM can be used to provide a suitable response to the user that includes the accommodations determined in activity 840. For example, the fourth LLM can formulate a response that has appropriate length, tone, and/or language. The response formulated in activity 860 can be sent to the user in response to the query. In many embodiments, method 800 can occur in real-time after the query is received, such that the response is sent to the user in real-time after the user sends the query.

In a number of embodiments, the fourth LLM is (a) pre-trained on a corpus, and/or (b) fine-tuned to predict a plurality of respective new tokens in response to a respective query based on training examples modeling length, tone, and language. In various embodiments, the fourth LLM is fine-tuned by passing parameters of the fourth LLM through multiple neural network linear layers to update the parameters of the fourth LLM. In some embodiments, the fourth LLM can be fine-tuned (such as prior to being used in activity 860) using a process similar to the fine-tuning process described above in connection with activity 830. The model can similarly be passed through several linear layers of a neural network with the model parameters updated. In some embodiments, a difference can be that the generated text has many tokens, not just one.

Here is one training example for fine-tuning the fourth LLM:

{"messages": [{"role": "system", "content": "You are a highly intelligent Q&A bot for Inclusively, an online job platform that assists people looking for workplace accommodations, called success enablers, to request from their employer. Many users are people with disabilities but some users may want accommodations because they are trans, pregnant, or have other needs. Keep a professional tone but do not sympathize with the user or say \"sorry\". Use vocabulary no higher than a sixth grade level and respond in paragraph less than 150 words. If you don't know the answer, just say that you don't know, don't try to make up an answer. Finish each response by asking the user a question, such as \"Do you need anymore assistance?\" Refer to accommodations as success enablers. If a user says something like \"I have autism\" or \"I walk with a cane\" with no additional information, do not say anything about a medical diagnosis. Instead, ask them how their disability affects them at work and recommend accommodations based on their disability and information provided below:\n\n Toilets that are accessible follow the rules of the ADA, which makes it easier for people with wheelchairs and other mobility devices to use restrooms.\n Keywords: Furniture that can be changed to fit the needs of employees is called flexible furniture. It can help people using wheelchairs, as well as those with physical disabilities, by making the workplace more accessible. Flexible furniture can also be used to create workstations or meeting spaces that can help employees who have trouble focusing or get overwhelmed by sensory input.\n Keywords: wheelchairs, limited mobility\n\n The size or position of meeting tables may need to be changed so that people in wheelchairs or using special equipment can participate in the workplace.\n Keywords: People with disabilities who have difficulty getting around or who live in places with limited transportation options can be provided assistance to and from work or within the workplace."},
{"role": "user", "content": "What accommodations are helpful for wheelchair users?"},
{"role": "assistant", "content": "There are many success enablers to help people using wheelchairs in the workplace. It's important to ensure that common areas, such as break rooms and restrooms, are accessible for wheelchair users and follow ADA standards. This may involve installing accessible toilets, sinks, and grab bars. Another success enabler is adjustable desks or workstations that can be raised or lowered to accommodate wheelchair users at a comfortable height. It can be used to create workstations or meeting spaces. Assistance can also be provided for those who have difficulty getting around or live in places with limited transportation options. This can include help to and from work or within the workplace. Do you have any questions about this or any other success enablers?"}]}

Note that in the above, the prompt is the entirety of the "content" of the "system" role.

The fourth LLM can be trained and fine-tuned by creating training examples with suitable tone that answers appropriately. Note that this prompt includes information on success enablers, which can be a result of the search in activity 840. After the vector database returns the top answers, those are included in the prompt that the fine-tuned LLM uses, along with instructions for the fourth LLM to consider that information. The result is that the fourth LLM is able to use the success enablers specifically, rather than having the fourth LLM answer the user's query with no context. By providing training examples and fine-tuning the model, it makes the fourth LLM more likely to use the correct tone and length, avoid ableist language, and have it use the success enabler information appropriately.

The success enabler descriptions (associated with the results of the vector search) can be human-made, regarding disability and workplace accommodations. Using these combined activities, the artificial intelligence provided in method 800 is able to provide human-vetted recommendations on success enablers without using ableist language or assumptions. It can provide information on the success enablers to users while allowing them to add them to their profile for employers to see.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

Although artificial intelligence models in an automated chat assistant determining workplace accommodations, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-9 may be modified, and that the foregoing discussion of certain of these embodiments does not necessarily represent a complete description of all possible embodiments. For example, one or more of the procedures, processes, or activities of FIG. 8-9 may include different procedures, processes, and/or activities and be performed by many different modules, in many different orders, and/or one or more of the procedures, processes, or activities of FIGS. 8-9 may include one or more of the procedures, processes, or activities of another different one of FIGS. 8-9. As another example, the components within system 300 (FIG. 3) can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A computer-implemented method comprising:
   determining, using a second LLM, whether or not a query is related to accommodations, wherein the second LLM is fine-tuned to predict a respective new token representing a respective binary classification output in response to a respective query, wherein the second LLM is pre-trained using training input comprising (i) a first instructional prompt to the second LLM to classify a question with a completion of one of True or False for whether or not the question is related to accommodations, and (ii) training records each comprising (a) a first respective training question and (b) a first respective training completion comprising one of True or False as a predicted next token based on the first respective training question; and when the query is related to accommodations:
   determining one or more accommodations responsive to the query using a third LLM; and
   formulating a response to the query using a fourth LLM based on the one or more accommodations; and
when the query is not related to accommodations:
   generating a declining response using a text-generation LLM using a second instructional prompt comprising a text representation of a conversation history stored in a cache memory, wherein the conversation history comprises the query,
wherein:
   the third LLM is an embeddings LLM configured to determine a similarity between the query and accommodation descriptions;
   determining the one or more accommodations responsive to the query using the third LLM further comprises:
      generating a query embedding vector for the query using the embeddings LLM;
      performing a vector search comprising searching a vector database for one or more top matches of embeddings of the accommodation descriptions with respect to the query embedding vector, comprising calculating, using a cosine similarity measure for determining a vector distance, a respective vector distance metric between each of the embeddings of the accommodation descriptions and the query embedding vector, wherein the vector database comprises the embeddings of the accommodation descriptions that are predetermined and stored before receiving the query, and wherein the one or more top matches are selected based on the respective vector distance metric for the one or more top matches being below a predetermined threshold; and
      determining the one or more accommodations based on the one or more top matches; and
   the fourth LLM is pre-trained using a third instructional prompt comprising instructions for how to address a medical diagnosis raised in a question, instructions for asking about how a disability affects work, and definitions of keywords, and one or more training records each comprising: a second respective training question and a second respective training completion comprising a respective informational answer responsive to the second respective training question based on the third instructional prompt.

2. The computer-implemented method of claim 1, wherein the second LLM is pre-trained on a corpus.

3. The computer-implemented method of claim 2, wherein the second LLM is fine-tuned by passing parameters of the second LLM through multiple neural network linear layers, using gradient descent and backpropagation, to update the parameters of the second LLM.

4. The computer-implemented method of claim 1, wherein the fourth LLM is a text-generation LLM.

5. The computer-implemented method of claim 4, wherein the fourth LLM is pre-trained on a corpus and fine-tuned to predict a plurality of respective new tokens in response to a respective query based on training examples modeling length, tone, and language.

6. The computer-implemented method of claim 5, wherein the fourth LLM is fine-tuned by passing parameters of the fourth LLM through multiple neural network linear layers to update the parameters of the fourth LLM.

7. A system comprising:
   one or more processors; and
   one or more non-transitory computer-readable media storing computing instructions that, when executed on the one or more processors, cause the one or more processors to perform operations comprising:
      determining, using a second LLM, whether or not a query is related to accommodations, wherein the second LLM is fine-tuned to predict a respective new token representing a respective binary classification output in response to a respective query, wherein the second LLM is pre-trained using training input comprising (i) a first instructional prompt to the second LLM to classify a question with a completion of one of True or False for whether or not the question is related to accommodations, and (ii) training records each comprising (a) a first respective training question and (b) a first respective training completion comprising one of True or False as a predicted next token based on the first respective training question; and
      when the query is related to accommodations:
         determining one or more accommodations responsive to the query using a third LLM; and
         formulating a response to the query using a fourth LLM based on the one or more accommodations; and
      when the query is not related to accommodations:
         generating a declining response using a text-generation LLM using a second instructional prompt comprising a text representation of a conversation history stored in a cache memory, wherein the conversation history comprises the query,
      wherein:
         the third LLM is an embeddings LLM configured to determine a similarity between the query and accommodation descriptions;
         determining the one or more accommodations responsive to the query using the third LLM further comprises:
            generating a query embedding vector for the query using the embeddings LLM;
            performing a vector search comprising searching a vector database for one or more top matches of embeddings of the accommodation descriptions with respect to the query embedding vector, comprising calculating, using a cosine similarity measure for determining a vector distance, a respective vector distance metric between each of the embeddings of the accommodation descriptions and the query embedding vector, wherein the vector database comprises the embeddings of the accommodation descriptions that are predetermined and stored before receiving the query, and wherein the one or more top matches are selected based on the respective vector distance metric for the one or more top matches being below a predetermined threshold; and
            determining the one or more accommodations based on the one or more top matches; and
         the fourth LLM is pre-trained using a third instructional prompt comprising instructions for how to address a medical diagnosis raised in a question, instructions for asking about how a disability affects work, and definitions of keywords, and one or more training records each comprising: a second respective training question and a second respective training completion comprising a respective informational answer responsive to the second respective training question based on the third instructional prompt.

8. The system of claim 7, wherein the second LLM is pre-trained on a corpus.

9. The system of claim 8, wherein the second LLM is fine-tuned by passing parameters of the second LLM through multiple neural network linear layers, using gradient descent and backpropagation, to update the parameters of the second LLM.

10. The system of claim 7, wherein the fourth LLM is a text-generation LLM.

11. The system of claim 10, wherein the fourth LLM is pre-trained on a corpus and fine-tuned to predict a plurality of respective new tokens in response to a respective query based on training examples modeling length, tone, and language.

12. The system of claim 11, wherein the fourth LLM is fine-tuned by passing parameters of the fourth LLM through multiple neural network linear layers to update the parameters of the fourth LLM.

* * * * *